Dec. 15, 1942.  E. G. BAILEY  2,304,788
FLUID HEAT EXCHANGE APPARATUS
Filed Dec. 27, 1938  3 Sheets-Sheet 1
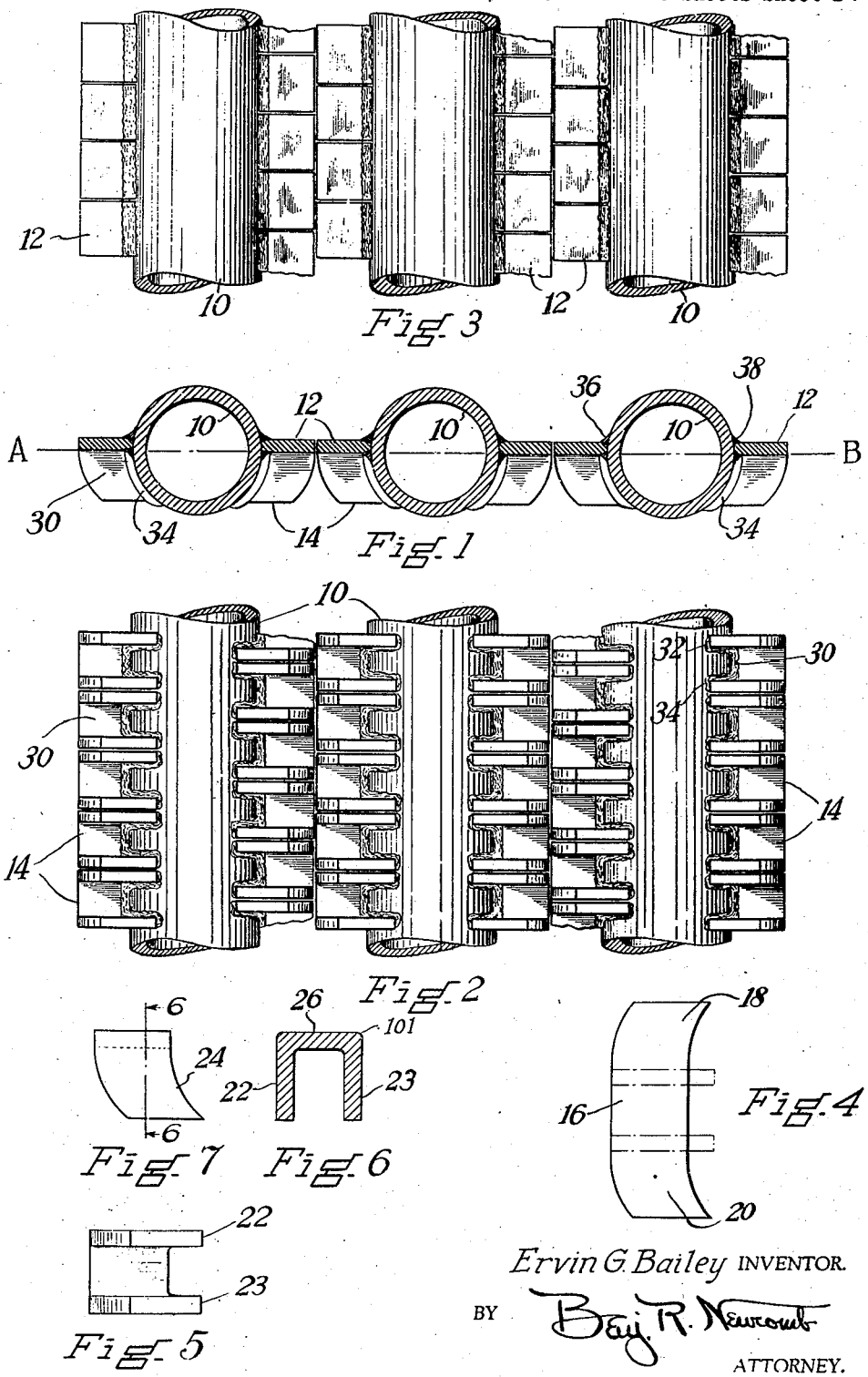
Ervin G. Bailey INVENTOR.
BY
ATTORNEY.

Dec. 15, 1942.  E. G. BAILEY  2,304,788
FLUID HEAT EXCHANGE APPARATUS
Filed Dec. 27, 1938  3 Sheets-Sheet 2
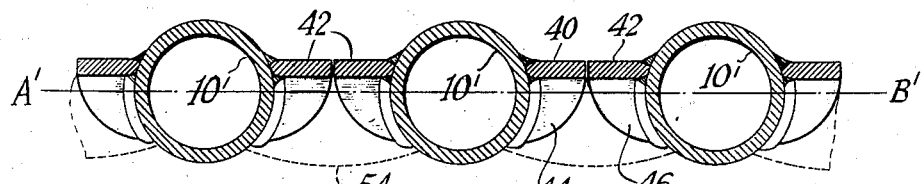
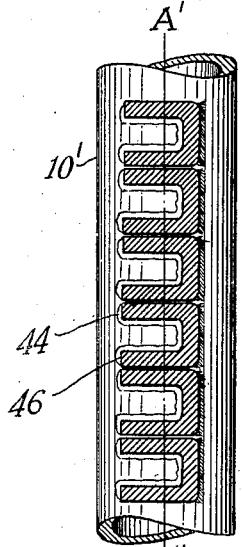
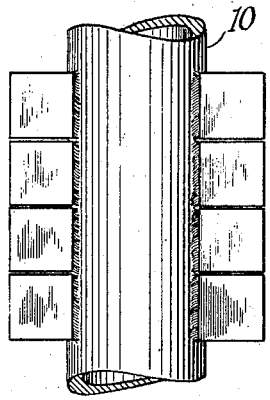
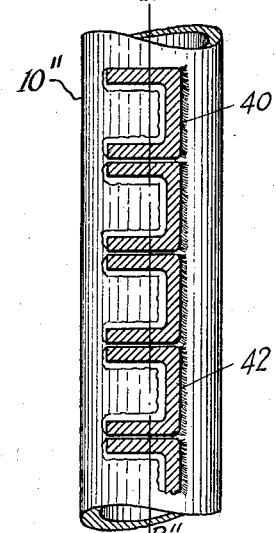
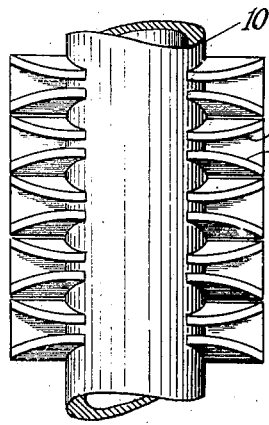
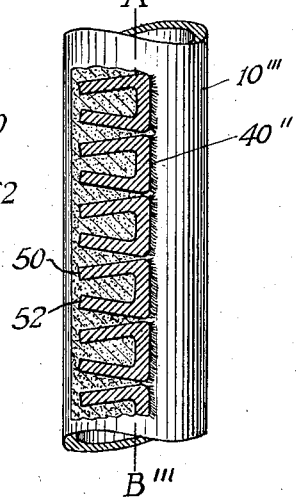
Ervin G. Bailey INVENTOR.
BY
ATTORNEY.

Dec. 15, 1942.  E. G. BAILEY  2,304,788
FLUID HEAT EXCHANGE APPARATUS
Filed Dec. 27, 1938   3 Sheets-Sheet 3
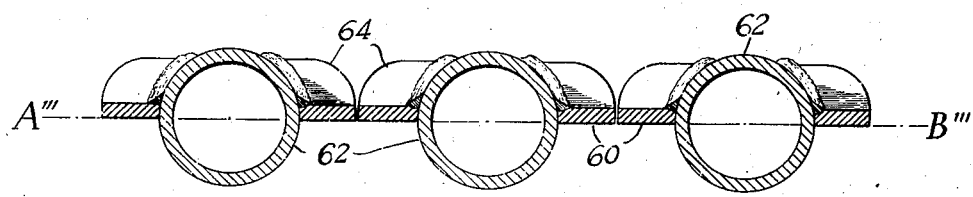
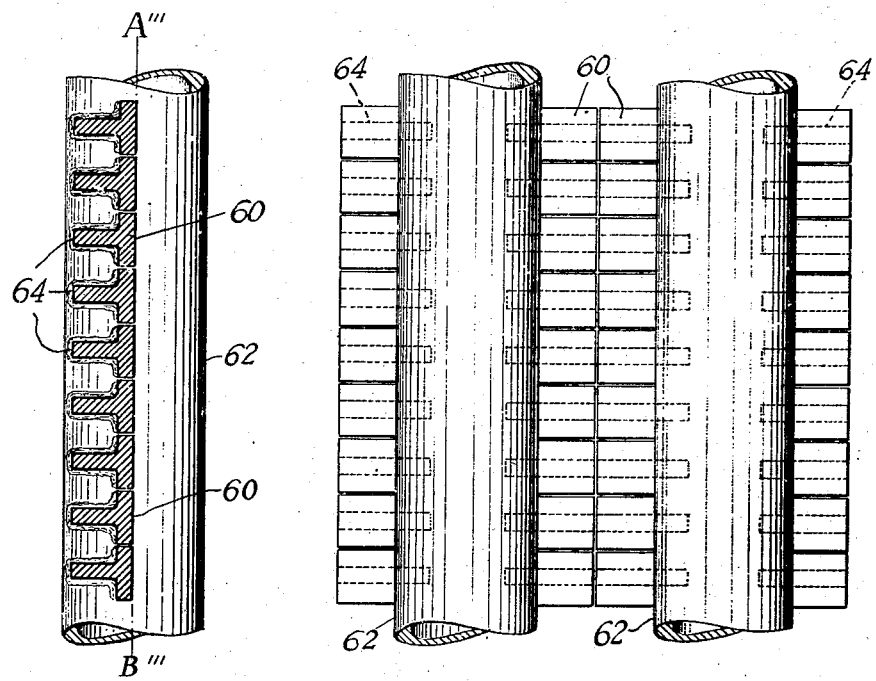
Ervin G. Bailey INVENTOR.
BY
ATTORNEY.

Patented Dec. 15, 1942

2,304,788

UNITED STATES PATENT OFFICE 2,304,788

FLUID HEAT EXCHANGE APPARATUS

Ervin G. Bailey, Easton, Pa., assignor to The Babcock & Wilcox Company, Newark, N. J., a corporation of New Jersey Application December 27, 1938, Serial No. 247,808

10 Claims. (Cl. 257—262)

This invention relates to fluid cooled furnace walls, and to tubular elements which can be advantageously employed in the construction and operation of furnaces including such walls. One type of furnace with which the invention is concerned involves the circulation of a fluid through furnace wall tubes and the utilization of the heat absorbed by the fluid to generate vapor or otherwise function in fluid heat exchange apparatus.

My invention is particularly applicable to water-cooled furnaces used in conjunction with steam boilers operating at high pressures and high capacities, and in which furnaces one or more of several fuels might be burned either separately or simultaneously with a high degree of efficiency resulting in high furnace temperatures.

In the case of furnaces in which pulverized coal is burned, the high temperature resulting from the efficient and complete combustion of the carbonaceous combustible material of the coal results in liberation of the ash, the ash being raised to a temperature above the fusion point of any of its several constituent chemical compounds so that individual particles of molten ash, or slag, and larger particles resulting from the coalescing of several individual particles exist in the gases resulting from combustion. Some of these particles contact the furnace walls and adhere thereto, at first being chilled and solidified by the proximity to the cooler surfaces produced by the fluid circulation through the water cooled elements, but as a stratum of this chilled slag is built up from the cool wall surface a thickness is ultimately reached which, due to the thermal resistance of the layer so formed, and the high temperature existing in the furnace, results in the surface of the stratum being at the fusion temperature of the slag and additional particles deposited thereon remain in molten condition and flow down the surface of the stratum. Other particles of molten slag remain in suspension in the gases as they flow through the furnace and subsequent gas passages, some of these contacting the walls of these passages as they progress. If these passages are water cooled heat is radiated from the particles, as well as from the gases, to the walls and is absorbed, and the degree of radiation and absorption will vary with the temperature differential between the particles and the heat receiving or wall surface, which differential in turn will be dependent upon the cleanliness of the wall surface or its freedom from slag accumulations and the attendant thermal resistance and higher surface temperature caused thereby.

Some of these conditions are beneficial to one stage of the combustion and heat absorption process but detrimental to other stages. In the zone where combustion is actually taking place it is eminently desirable to have the furnace boundary walls at a high temperature in order to insure the expedition and completion of combustion, while after substantially complete combustion has been satisfactorily accomplished the major consideration is rapid heat absorption. This necessitates boundary walls at a low temperature to insure high temperature differentials and rapid heat transfer.

My present invention contemplates a construction that will not only meet these conditions satisfactorily but will do so with a degree of flexibility that is most desirable when it is appreciated that coals from different seams and deposits that are used in pulverized form in such furnaces all contain ash in greater or lesser amounts, and that the ashes from the different coals not only differ greatly in chemical composition but also in their fushion temperatures.

One object of my invention is to provide a water cooled element that can be used in a furnace wall construction subjected to the conditions outlined above that can be so designed and constructed as to present the form of surface to the furnace interior best suited to the conditions desired for maximum combustion and or heat absorption efficiency, that is, either a hot surface to promote and expedite complete combustion or a cold surface to result in maximum temperature differential conducive to a high rate of heat transfer.

Another object of my invention is to provide a slag covered furnace wall constructed of individual water cooled elements where such slag covering is beneficial, and by utilizing the same individual water cooled elements in a slightly different manner produce a cold, smooth metallic surface on which slag will have difficulty in accumulating and from which such slag as might adhere can be readily removed where such cold surface is beneficial.

A further object of my invention is to provide such a water cooled element for a furnace wall, that, for a predetermined coal and constituent ash requires a necessary degree of coldness or rate at which heat should be absorbed, and can be utilized in different manners to meet specific conditions that will be encountered in operation.

Still further objects are to produce superior water cooled elements and resulting furnace wall constructions characterized by this simplicity of fabrication and construction, and, inherently capable, even in a single embodiment, of advantageously meeting a wide range of operating conditions.

The novelty which characterizes my invention will be pointed out with particularity in the claims annexed hereto and forming a part of this specification, and the invention will be described with reference to the accompanying drawings in which I have illustrated certain preferred embodiments.

In the drawings:

Fig. 1 is a horizontal section through the tubular elements of a furnace wall constructed in accordance with the teachings of my invention.

Fig. 2 is an elevation of the furnace wall shown in Fig. 1 looking toward the side thereof with the metallic extensions thereon at right angles to the axis of the tube, and without the inclusion of any non-metallic refractory material in the wall construction.

Fig. 3 is an elevation of the furnace wall shown in Fig. 1 looking toward the side thereof with the metallic extensions being lengthwise of the tube, this elevation being diametrically opposite to that shown in Fig. 2.

Fig. 4 is a plan view of a metallic blank which is cut so as to permit the forming of the metallic extensions to be attached to the tube in accordance with the present invention.

Fig. 5 is an elevation of one of the illustrative metallic extensions formed by bending the metallic blank indicated in Fig. 4.

Fig. 6 is a section of the aforementioned metallic extension taken on the line 6—6 of Fig. 7.

Fig. 7 is a side elevational view of the metallic extension shown in Figs. 5 and 6.

Fig. 8 is a horizontal section through a wall arrangement employing a modified form of metallic extension.

Fig. 9 is a vertical section on a plane passing through U bent metallic extensions.

Fig. 10 is a section on the same plane as Fig. 9 but showing a modified form of U bent metallic extensions to meet a set of furnace conditions different from those met by the arrangement shown in Fig. 9.

Fig. 11 is an elevation of the tubular element of Fig. 9 showing the smooth surfaces of the U bent metallic extensions.

Fig. 12 is a section on the same plane as Fig. 9 showing a modified form of U bent metallic extensions located differently with respect to the tube and showing non-metallic refractory material applied as a part of the wall structure.

Fig. 13 is an elevation of one of the tubular elements of the wall indicated in Fig. 12 with the refractory material not shown.

Fig. 14 is similar to Fig. 12 but showing a further modification of U bent metallic extension.

Fig. 15 is a plan view of a further modified construction of stud plate wall shown in greater detail in Figs. 16 and 17, in which the plate is in the shape of a T rather than a U.

Fig. 16 is a side elevation of the arrangement shown in Fig. 15, and

Fig. 17 is a part elevation of the arrangement shown in Fig. 15.

The illustrative wall construction may have its tubes connected into a boiler circulation system; and it may be otherwise arranged as are the furnace walls shown in my co-pending application Serial No. 88,285, filed on July 1, 1936, the wall tubes being connected at their opposite ends to headers with which appropriate circulating connections communicate.

As shown in Figs. 1, 2 and 3 of the drawings, wall tubes 10 are spaced from each other and arranged in a plane to form a wall. The spaces between the tubes are essentially closed by the central parts 12 of the U bent metallic extensions or stud plates 14. These stud plates are shown in detail in Figs. 5, 6 and 7 of the drawings.

The stud plates 14 are formed from blanks such as the blank 16 of Fig. 4, and their manufacture is facilitated by cutting these blanks from steel plate and bending them to the U form indicated in Figs. 5, 6 and 7, in one operation. It will be noted that the end portions 18 and 20 of the blank 16 are cut with curved edges, so that when the blank is bent to its U form the resulting flanges 22 and 23 have curved edges, the curvature being such as to correspond with the curvature of the external surface of the tube to which it is to be attached.

In the manufacture of one of the tubular elements forming the wall indicated in Figs. 1, 2 and 3 of the drawings the U bent stud plates are positioned in rows longitudinally of the tube, with the faces 26 of the stud plates in alignment and the curved surfaces 24 of the stud plate flanges fitting closely against the tube. The bending of the blank 16 to form the stud plate 14 is accomplished in such a manner that the radius of curvature between the surface 26 and the surfaces of the flanges 22 and 23 as indicated at 101 in Fig. 6 is as small as possible. By having this small radius of curvature, and furthermore assuming that the surfaces 22, 23 and 26 are as smooth as possible, the stud plates can be attached to the tube very close together, the surfaces 26 of adjacent stud plates 14 providing an essentially continuous smooth surface which is desirable for minimizing slag accumulation thereon. The curved edges 24 of the flanges 22 and 23 are likewise made as smooth as possible in order to provide a good contact with the surface of the tube to which they are attached by brazing, welding, or other such means, as indicated at 30, 32, 34, 36 and 38 in Figs. 1, 2 and 3. Either or both of these methods of attaching the stud plates to the tubular elements may be employed, the essential consideration being that a good and effective attachment is procured to insure the adequate flow of heat from the metallic extensions to the tubular element during the operation of the furnace in which they are installed and form a part of the furnace walls.

In the modification of my invention indicated in Figs. 8 and 9 of the drawings the surfaces 40 and 42 of the U bent stud plates are positioned at a greater distance from the center line A'—B' of the tubes 10' than are the surfaces 12 of the U bent stud plates positioned from the center line A—B of the tubes 10 in Figs. 1, 2, 3 and 4. Fig. 8 also illustrates the application of high temperature refractory material 54 applied in a semi-plastic condition between and over the flanges of the stud plates to meet certain furnace conditions that will be described later. Fig. 10 shows a modification of Fig. 9 in which the furnace face portions of the U bent stud plates are wider but attached to the tube 10" with the surfaces 40 and 42 at a corresponding distance from the centre line A"—B" of the tubes 10".

Figs. 12 and 14 shows views corresponding to Figs. 9 and 10 with a modified form of stud plate attached to the tube 10''' in a similar manner and with the surfaces 40'' and 42'' a distance from the center line A'''—B''' to suit the conditions under which the resulting furnace tubular element is to be operated. These figures also show the application of the plastic high temperature refractory material between and over the stud plate flanges.

Fig. 13 is a rear view in elevation of the construction shown in Fig. 11 without, however, indicating the application of plastic high temperature refractory.

The particular construction of the U bent stud plates indicated in Figs. 11, 12, 13 and 14, and particularly the angularity of the flanges 50 and 52 with respect to the portions 40 (or 40'') of the plates parallel with the longitudinal axis of the tube provides an effective means for holding the refractory material in place on the wall structure, the angularity of the flanges providing a wedging action for holding the refractory in place.

Figs. 15, 16 and 17 illustrate a modified construction of stud plate in which the cross section is in the form of a T rather than a U such as the stud plate so far described. In this form of plate there is only one flange 64 instead of two. This construction of stud plate, while not being as applicable to the most severe service conditions as would the U plate construction, would nevertheless be satisfactory for more moderate service conditions in addition to being simpler and less expensive to install. The T stud plate functions similarly to the U stud plate and the flange 64 is so located with respect to the portion 60 that the heat is conducted from the portion 60 equally about its center line corresponding to the center line of the flange, thus obviating inequality of the heating portion 60 with resulting high temperature and possible burning. Furthermore, the thickness of the flange may be greater than the thickness of the portion 60 to meet the conditions of heat conduction of the service to which it is to be applied.

The general method of construction of the T stud plate, its attachment to the tube, its positioning with respect to the center line of the tube, the application of plastic high temperature refractory and its general functioning in operation is the same as described for the U bent stud plate, the only difference being the degree of intensity of service for which it would be applicable.

As has been previously described, the conditions to be met in a furnace in which pulverized coal is being burned vary considerably depending upon the physical and chemical characteristics of the ash in the coal, and particularly its fusion temperature. My invention is particularly useful in that it permits the construction of a tubular element to be used in the furnace wall construction especially applicable to the particular conditions to be encountered in any particular location. For example, in a furnace in which it is desired to maintain a high temperature above the fusion point of the ash in the coal being used in order to effectively and efficiently burn the pulverized coal and remove in molten state such ash that might be deposited on the walls, roof and floor of the furnace, the tubular element of my invention would be installed in the furnace wall with the flanges of the stud plates facing toward the furnace, and high temperature refractory material, originally applied in the plastic state, between and over said flanges, so that the furnace wall surface would be refractory and, whilst maintaining the furnace temperature for combustion purposes by the deposition and building up of slag on the refractory surface, some heat would be conducted through the stud plate flanges and thence through the tubular element to the fluid circulating therein, thus insuring long life and low maintenance of the wall structure while maintaining the desired high temperature conditions. Further than this, I can modify the heat transferred through the refractory coating to the tube and the fluid therein by modifying the width or thickness of the stud plate, or both, and further modifying the holding power of the plates for retaining the refractory and holding it in place by a variation in the angularity of the stud plate flanges to provide greater or lesser wedging action and holding power as desired.

In another zone in the same furnace, as in a secondary furnace or a gas passage leading away from the furnace in a location where the combustion of the pulverized coal has been completed an entirely different set of conditions might prevail in which the primary consideration might be the rapid absorption of heat and cooling of the gases with slag particles in suspension to condition them in order that they might be permitted to flow over a relatively closely spaced convection tube bank such as a bank of boiler tubes or superheater tubes without causing slagging of such tubes. Under these conditions the tubular element of my invention would be installed in the furnace wall with the smooth faces of the stud plates facing the furnace chamber or gas passes with the flanges rearwardly of the wall. With these operating conditions such slag as might adhere to the smooth metallic surface of the furnace wall can be easily and readily removed, if it does not drop therefrom itself because of the cleavage plane formed by the smooth surfaces of the stud plates eliminating any possibility of adhered slag obtaining a foothold that would result in a slag accumulation, and thus the whole wall surface exposed to the gases kept at a low temperature by means of the good transfer of heat from the smooth surface through the flanges not exposed to the heat rearwardly of the furnace face, through the tubular element into the fluid circulating therethrough. Further than this, I can modify the tubular element of my invention to meet different heat inputs in different furnaces or gas passages or in different locations in the same furnaces or gas passages by varying the width of the stud plates or the thickness of the metal blank from which the stud plates are fabricated, or both, and can still further position the stud plate with respect to the center line of the tube to which it is attached so that the smooth surface presented can be almost tangent with the front of the tube toward the furnace or back on or beyond the center line of the tube. I would make the stud plates approach the tangent of the front face of the tube, for example, in installations where an excessive quantity of slag was to be expected and where it would be desirable to eliminate to the greatest degree any accumulation of slag, for as the smooth surfaces of the stud plates approach the tangent and thence more nearly to a smooth uninterrupted surface the greater will be the cleavage action and removal of slag therefrom. Again, where exceedingly high heat inputs are to be encountered, the location of the smooth surface of the stud plate with respect to the tube center line would be determined by the slag condition, but I would make the stud plates both thicker and narrower to insure the best possible transfer of heat to the tube and the fluid circulating therein and thus preserve the integrity of the construction and increase the life and decrease the maintenance of the furnace construction.

From these examples the importance of insuring smooth surfaces, good contact between the edges of the stud plate in contact with the exterior surface of the tube and effective attachment by means of brazing or welding will be appreciated, as also will be the importance of the flanges of the stud plate for conducting the heat from the surface in contact with the gases back through a relatively large area of the tube surface, which area, and the flanges, are not exposed to the hot gases.

In other constructions, as for example illustrated in my copending application Serial No. 88,285, filed July 1, 1936, previously mentioned, wall constructions are employed which separate two furnace chambers and as such are subjected to heat on both sides, a primary furnace on one side, for example, necessitating a high temperature for combustion conditions and molten slag removal, while the secondary furnace on the other side necessitates maximum heat absorption. The tubular element and wall construction of my invention is most applicable in a construction such as this, as the side of the wall having the stud plate flanges covered with refractory material would be facing the primary furnace, and the other side of the wall having a smooth cool surface would face the secondary furnace and the requirements of each zone would be adequately satisfied. This would be an example of construction in which the stud plates would be narrow and thick in order to accommodate the high heat input imposed upon the construction by having hot gases on both sides of the wall. In another zone of the same secondary furnace where the gases are cooler and the heat input less not only because of the cooler gases but because of the gases being only on one side of the wall, the stud plates might be made wider and of thinner metal to satisfy the conditions imposed quite adequately. These different stud plate constructions can be applied to the same tube as would be the situation in this particular instance.

While I have described my invention with reference to certain particular embodiments, it is to be understood that it is not limited to all of the details of those embodiments, and it is contemplated that various modifications and arrangements of the elements may be included within the scope of the invention. For example, the number and particular contour of the flanges of the U bent stud plates may be modified, so long as they properly cooperate with the remaining elements of the combination. Again, nonmetallic refractory may be employed with any of the modifications of the invention, and the refractory material may be applied in a manner different from that described.

In general, the scope of the invention is indicated by the subjoined claims.

I claim:

1. A tubular unit for fluid cooled furnace walls comprising, a metallic tube, and metallic extended surface elements arranged along opposing sides of the tube and joined to the tube metal in good heat transfer relationship, said extended surface elements having each a substantially channel-shaped cross section with flanges extending transversely of the longitudinal axis of the tube and joined by a flat web which is substantially parallel to that axis, the webs being aligned and arranged closely adjacent each other to present an essentially continuous smooth surface disposed between two parallel planes tangent to the tube at opposite sides.

2. In an integral unit for furnace walls, a tube, and angled stud plates welded to the tube in separate rows on opposite sides of the tube and having closely adjacent face portions presenting essentially continuous smooth heat absorbing surfaces disposed longitudinally of the tube, said stud plates also including projections integral with the face portions and extending transversely thereof and transversely of the tube, said angled plates being united with the tube by welding said projections to the tube along arcs of the tube circumference.

3. In a heat transfer unit, a metallic tube, separate rows of angle-bent stud plates forming extended surface elements on opposite sides of the tube with opposite surfaces of the tube separating said rows, said plates in each of said rows including heat absorbing sections aligned longitudinally of the tube presenting essentially smooth surfaces, said plates also including heat transfer parts integral with said sections and extending transversely thereof and transversely of the tube, said sections and parts being welded to the tube with said parts acting as a medium for heat transfer between the tube and said sections.

4. In an integral heat transfer unit, a metallic tube, separate rows of extended surface elements of channel-like cross section on opposite sides of the tube, said elements in each of said rows including heat absorbing face portions aligned longitudinally of the tube and presenting smooth and essentially continuous heat absorbing surfaces, each of said elements also including a pair of heat transfer flanges integral with said face portion and extending transversely of the tube, said flanges being welded to the tube so that they act as a medium for heat transfer between the tube and said face portions.

5. In a heat transfer unit, a metallic tube, and sections of a rolled T shape welded to the tube and arranged as separate rows of extended surface elements on opposite sides of the tube, the flanges of said sections being closely adjacent each other and aligned to present smooth and essentially continuous heat absorbing heat transfer surfaces extending longitudinally of the tube, the stem of each of said elements acting as a medium of heat transfer to the flanges and extending transversely of the tube, said stems and flanges being welded to the tube.

6. In a heat transfer unit, a metallic tube, separate rows of extended surface elements on opposite sides of the tube, said elements including straight heat absorbing sections aligned longitudinally of the tube and disposed so closely adjacent each other that they present an essentially continuous and smooth fin-like surface parallel to the longitudinal axis of the tube, said elements also including essentially straight flanges integral therewith and extending transversely of the heat absorbing sections and transversely of the tube, said sections and flanges being welded to the tube with the flanges acting as a medium for heat transfer between the tube and said sections, said flanges being of substantially the same thickness as the heat absorbing sections and extending over a substantial arc of the tube surface.

7. In an integral unit for furnace walls, a tube, and angled stud plates welded to the tube in a row on the side of the tube and having closely adjacent face portions presenting essentially continuous smooth heat absorbing surfaces disposed longitudinally of the tube, said stud plates also including projections integral with the face portions and extending transversely thereof and transversely of the tube, said angled plates being united with the tube by the welding of said projections to the tube along arcs of the tube circumference.

8. In an integral heat transfer unit, a metallic tube, a row of extended surface elements of channel-like cross section on the side of the tube, said elements including heat absorbing face portions aligned longitudinally of the tube and presenting smooth and essentially continuous heat absorbing surfaces, each of said elements also including a pair of heat transfer flanges integral with its face portion and extending transversely of the tube, said flanges being welded to the tube so that they act as a medium for heat transfer between the tube and said face portions.

9. In a heat transfer unit, a metallic tube, and sections of a rolled T shape welded to the tube and arranged as a row of extended surface elements on the side of the tube, the flanges of said sections being closely adjacent each other and aligned to present smooth and essentially continuous heat absorbing heat transfer surfaces extending longitudinally of the tube, the stem of each of said elements acting as a medium of heat transfer to the flanges and extending transversely of the tube, said stems and flanges being welded to the tube.

10. In a heat transfer unit, a metallic tube, a row of extended surface elements on the side of the tube, said elements including straight heat absorbing sections aligned longitudinally of the tube and disposed so closely adjacent each other that they present an essentially continuous and smooth fin-like surface parallel to the longitudinal axis of the tube, said elements also including essentially straight flanges integral therewith and extending transversely of the heat absorbing sections and transversely of the tube, said sections and flanges being welded to the tube with the flanges acting as a medium for heat transfer between the tube and said sections, said flanges being of substantially the same thickness as the heat absorbing sections and extending over a substantial arc of the tube surface.

ERVIN G. BAILEY.